(12) United States Patent
Johnson et al.

(10) Patent No.: US 8,837,070 B1
(45) Date of Patent: Sep. 16, 2014

(54) CAPACITIVE CLEARANCE DETECTION FOR A MAGNETIC HEAD

(71) Applicant: Seagate Technology LLC, Cupertino, CA (US)

(72) Inventors: Michael Thomas Johnson, Minneapolis, MN (US); Pablo G. Levi, St. Paul, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/867,756

(22) Filed: Apr. 22, 2013

(51) Int. Cl.
*G11B 5/02* (2006.01)
*G11B 21/12* (2006.01)

(52) U.S. Cl.
CPC ................................ *G11B 21/12* (2013.01)
USPC .................... 360/55; 360/43; 360/39; 360/69

(58) Field of Classification Search
None
See application file for complete search history.

(56) References Cited

U.S. PATENT DOCUMENTS

| | | | |
|---|---|---|---|
| 4,931,887 A | 6/1990 | Hegde et al. | |
| 6,728,050 B2 * | 4/2004 | Wilson | 360/31 |
| 7,405,896 B2 | 7/2008 | Hirano et al. | |
| 7,660,068 B1 | 2/2010 | Baumgart et al. | |
| 8,245,573 B2 | 8/2012 | Lammel | |
| 2005/0174665 A1 * | 8/2005 | Zhang et al. | 360/25 |

* cited by examiner

*Primary Examiner* — Muhammad N Edun
(74) *Attorney, Agent, or Firm* — Hollingsworth Davis, LLC

(57) ABSTRACT

A modulated signal of a predetermined frequency is applied to a capacitive sensor of a magnetic head. The capacitive sensor is located proximate to a media-facing surface of the magnetic head. A clearance between the magnetic head and a magnetic medium is determined using a response to the modulated signal at the predetermined frequency.

19 Claims, 4 Drawing Sheets

CAPACITIVE CLEARANCE DETECTION FOR A MAGNETIC HEAD

SUMMARY

The present disclosure is directed to capacitance clearance detection for a magnetic head. In one embodiment, a method involves applying a modulated signal of a predetermined frequency to a capacitive sensor of a magnetic head. The capacitive sensor is located proximate to a media-facing surface of the magnetic head. A clearance between the magnetic head and a magnetic medium is determined using a response to the modulated signal at the predetermined frequency.

In another embodiment, an apparatus includes a slider having a capacitive sensor and magnetic head proximate a media-facing surface of the magnetic head. A modulation circuit is coupled to the capacitive sensor and configured to apply a modulated signal of a predetermined frequency to the capacitive sensor. An analysis circuit is coupled to the capacitive sensor and configured to determine a clearance between the magnetic head and a magnetic medium using a response to the modulated signal at the predetermined frequency.

In another embodiment, an apparatus includes a magnetic head having a capacitive sensor proximate a media-facing surface of the magnetic head, and an actuator used to adjust a clearance between the magnetic head and a magnetic medium at the media-facing surface. A modulation circuit is coupled to the magnetic head and configured to apply a modulated signal of a predetermined frequency to the actuator. An analysis circuit is coupled to the magnetic head and configured to read a response signal generated at the capacitive sensor. In response to the modulated signal applied to the actuator, the analysis circuit determines the clearance between the magnetic head and the magnetic medium using a component of the response signal at the predetermined frequency.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic recording devices used for data storage. In embodiments described below, a clearance between a magnetic head and medium is measured using a capacitive contact pad sensor. These measurements can be used for control of the clearance, e.g., used as feedback for an actuator for fine clearance adjustments. The measurements may also be used for contact detection, e.g., determining when physical contact between the magnetic head and medium occurs. A signal that measures the capacitance of the sensor uses a predetermined frequency that can be selected to be non-interfering with other system frequencies, such as resonant vibration frequencies and other, unrelated, signal processing frequencies.

Generally, magnetic data storage systems may include one or more recording heads that read and write information to a magnetic recording medium. It is often desirable to have a relatively small distance or clearance between a recording head and its associated media. This distance or clearance is sometimes referred to as "flying height" or "head-media spacing." By reducing the clearance, a recording head may better be able to both write data to and read data from a medium. Reducing the head-media spacing also allows for surveying of recording medium topography, such as for detecting asperities and other features of the recording medium surface. However, as clearances are reduced, it becomes more challenging to maintain a relatively consistent head-media spacing during operations such as reading and writing.

Figure 1:
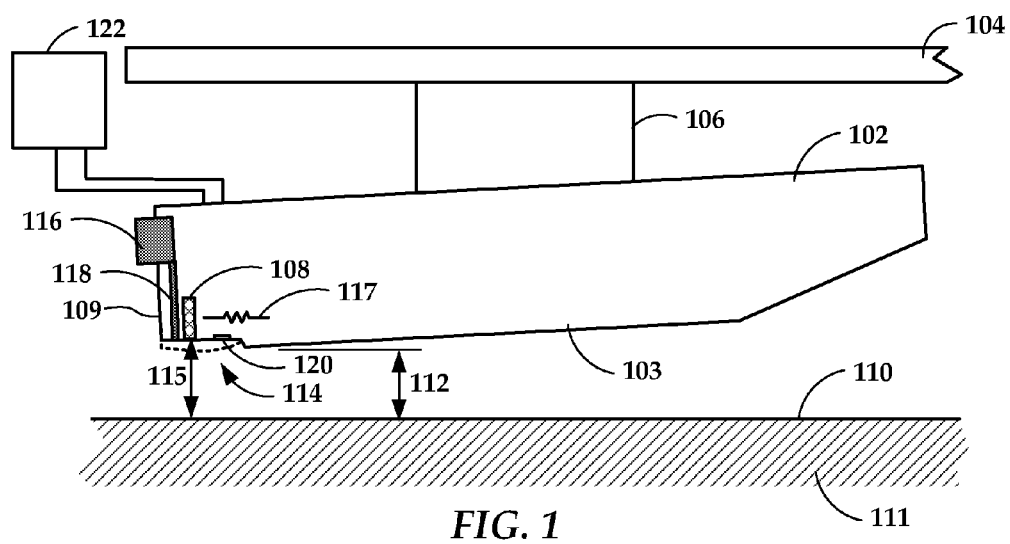
FIG. 1 is a block diagram of a hard drive slider and magnetic medium according to an example embodiment.

In reference now to FIG. 1, a block diagram shows a side view of a hard drive slider apparatus 102 according to an example embodiment. The slider 102 is coupled to an arm 104 by way of a suspension 106 (e.g., gimbal) that allows some relative motion between the slider 102 and arm 104. The slider 102 includes a magnetic read/write head 108 at a trailing edge 109. The read/write head 108 is held proximate to a surface 110 of a magnetic recording medium 111, e.g., magnetic disk. When the slider 102 is located over surface 110 of the recording medium 111, a flying height 112 is maintained between the slider 102 and the surface 110 by a downward force of arm 104. This downward force is counterbalanced by an air cushion that exists between the media surface 110 and a media-facing surface 103 (e.g., air-bearing surface) of the slider 102 when the recording medium 111 is rotating.

It is desirable to maintain a predetermined slider flying height 112 over a range of disk rotational speeds during both reading and writing operations to ensure consistent performance. Region 114 is a "close point" of the slider 102, which is generally understood to be the closest point of contact between the slider 102 and the magnetic recording medium 111 (e.g., near the read/write head 108). To account for both static and dynamic variations that may affect slider flying height 112, the slider 102 may be configured such that the close region 114 of the slider 102 can be configurably adjusted during operation to affect a head-media spacing 115. This is shown in FIG. 1A by dotted line that represents a change in geometry of the region 114.

The geometry change in region 114 may be induced by one more actuators of the slider 102. For example, a heater 117 may increase or decrease temperature to induce a change of shape in the region 114 through thermal expansion and contraction. The magnitude of the geometry change can be influenced by, e.g., forming the region from a material that has different coefficient of thermal expansion than other parts of the slider 102. Other elements of the slider 102 may also provide heat besides or in addition to the heating element 117. For example, a write coil of the magnetic read/write head 108 may generate sufficient heat to cause configurable deformation of region 114. The illustrated slider 102 is a heat-assisted media recording (HAMR) device, in which a laser 116 is used to heat the media surface 110 while recording. Energy from the laser 116 may also generate sufficient heat near the region 114 to influence head-media spacing 115.

Other actuators e.g., a piezoelectric element (not shown) may also be used to adjust the effective head-media spacing 115. Such an element may change shape in response to an applied electrical charge. For purposes of the following discussion, any element that induces a change in head-media spacing 115 in response to a control signal may be considered an actuator for purposes of the following discussion, including heating elements and/or piezoelectric elements.

In this particular example, the disk 111 is a heat-assisted magnetic recording (HAMR) medium, also sometimes referred to as a thermal-assisted magnetic medium (TAMR). A HAMR medium 111 has high coercivity and so is able to overcome superparamagnetic effects that limit the areal data density of magnetic media in common use today. A small portion, or "hot spot," of the medium 111 is locally heated to its Curie temperature, thereby allowing magnetic orientation of the medium 111 to be changed at the hot spot while being written to by transducer 108.

An energy source such as a laser 116 may provide the energy to create these hot spots. The laser 116 may be built into or attached to the slider 102, which includes an optical pathway 118 (e.g., waveguide, mirrors, lenses) configured direct and focus this energy onto a hotspot of the medium 111. While FIG. 1 illustrates a HAMR device, the clearance detecting methods and apparatuses described herein may be applicable to both HAMR and non-HAMR magnetic data storage devices and associated media.

The slider 102 includes a capacitive sensor 120 that is capacitively coupled to the medium 111 at least when the slider 102 is held proximate to surface 110. The capacitive sensor 120 may be a dedicated sensor element (e.g., metallic, thin-film, pad structure formed at or near region 114) or may be part of an existing component of the slider 102. For example, a conductive element such as part of a write element (e.g., return pole) or read element (e.g., shield) may be configured as a capacitive sensor 120. The capacitive sensor 120 is coupled to measurement and control circuitry 122 that facilitates determining clearances based on measured capacitance. The measurement and control circuitry 122 may also be coupled to an actuator (e.g., heater 117) to adjust head-media spacing 115 in response to the measurements.

Figure 2:
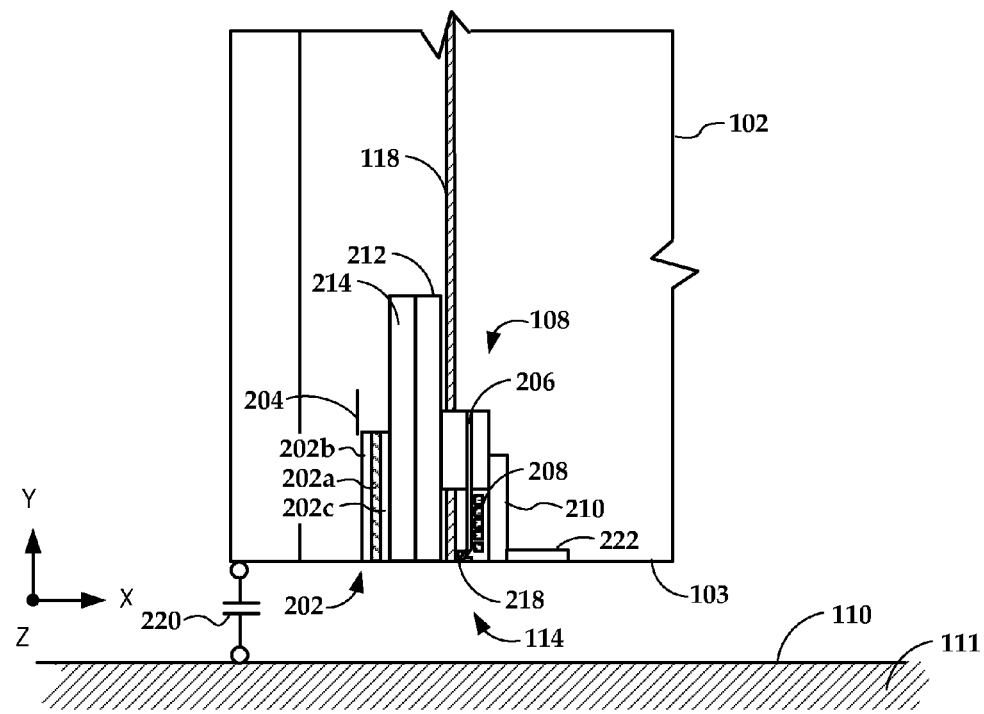
FIG. 2 is a cross-sectional view of a magnetic read and write head according to an example embodiment.

In reference now to FIG. 2, a cross-sectional diagram shows components of a read/write transducer 108 according to an example embodiment. This diagram shows a portion of slider 102 near the close-point region 114. In this view, the x-direction is down-track relative to the media, and the z-direction (normal to the plane of the page) is the cross-track direction. A read sensor 202 is located near the media-facing surface 103. The read sensor may include a magnetoresistive stack 202a and shields 202b, 202c. A reader heater 204 may be implemented to adjust local spacing between the read sensor 202 and the media surface 110.

A write pole 206 may include a ferromagnetic structure that extends to the media-facing surface 103. A write coil 208 is energized to generate a magnetic field within the write pole 206, the magnetic field extending to the media surface 110. The slider 102 may be configured for perpendicular recording, wherein the magnetic orientation is perpendicular (oriented along the y-direction in this view) to the media surface 110. Accordingly, the slider may include one or more return poles 210, 212 that facilitate, along with a particular arrangement of layers in the medium 111, perpendicular orientation of the magnetic fields of the recorded data. A spacer 214 may be disposed between the read and write portions of the slider 102.

In order to write to the HAMR medium 111, the slider includes a waveguide 118 that extends towards the media-facing surface 103. The waveguide 118 delivers light to a near-field transducer (NFT) 218 that is located at the media-facing surface 103 proximate a tip of the write pole 206. The NFT 218 facilitates directing a beam of electromagnetic energy to the media surface 110 during write operations. The energy creates a small hotspot on the media surface 110 with lowered magnetic coercivity, enabling a magnetic field generated from the write pole 206 to affect magnetic orientation within the hotspot.

Any conductive component such as return poles 210, 212, shields 202b, 202c, etc., may be coupled to a signal line to measure a capacitance value 220 that exists between the slider 102 and media 111. A dedicated sensor pad 222 may be included instead of or in addition to these existing components. Generally, any conductive component of the slider 102 proximate the media-facing surface 103 that can be coupled an electrical signal can serve as all or part of a capacitive sensor.

A capacitive sensor as described above can be used for measuring and maintain clearances. The capacitive sensor may also be used for detecting contact between the slider 102 and media 111. Contact detection between the head and the disk is used to set read and write clearances in the head-disk interface. In general, a reliable contact detection signal facilitates accurately setting clearances, as well as minimizing the required amount of time in contact with the disk to provide a high signal-to-noise ratio (SNR) contact signature. For purposes of the present disclosure, unless otherwise indicated, any features capable of contact detection are also capable of detecting/measuring clearance, and vice versa.

In general, electrical and mechanical noise decreases the SNR for existing RMS-power-based contact detection configurations that depend on inherent contact modulation in the interface and use a band pass filter to process the contact signal. The result of this noise is a decrease in SNR and a poor contact signature. Poor contact detection results in poor drive reliability because of inaccurate clearance setting during drive calibration as well as wear resulting for poor contact detection during calibration.

Figure 3:
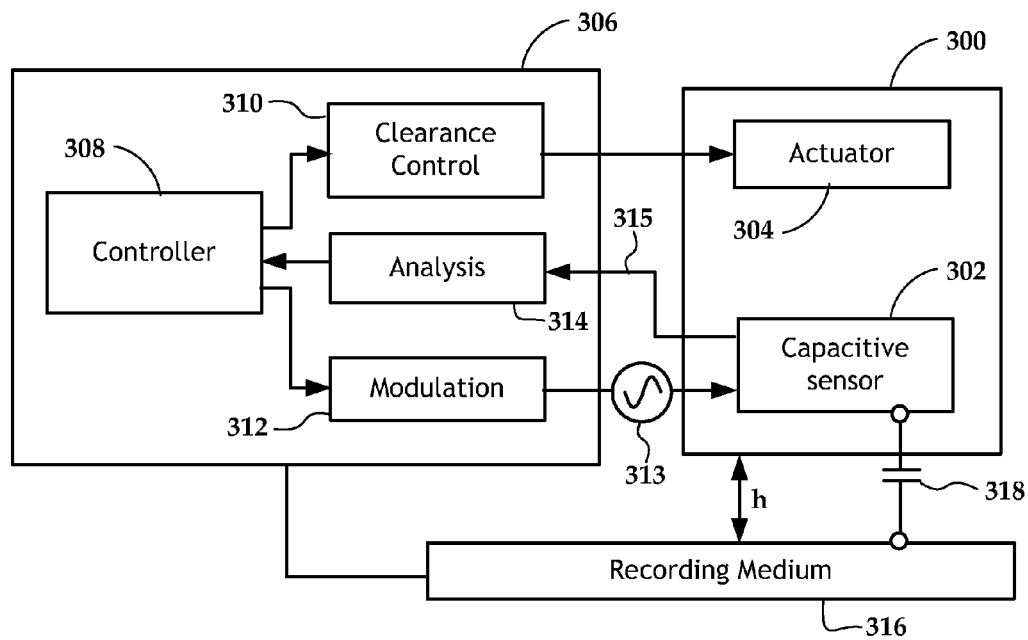
FIGS. 3 and 4 are block diagrams of capacitive clearance sensing arrangements according to example embodiments.

The capacitive contact pad sensor described above may be configured to sense contact and clearance in a number of different ways. In FIG. 3, a block diagram illustrates a capacitive contact sensing apparatus according to a first example arrangement. A slider 300 includes a capacitive sensor 302 as described above and a clearance actuator 304 (e.g., heater). The slider 300 may include other components not shown, such as magnetic read head, magnetic write head, optical HAMR components, thermal sensors, etc. The slider 300 is coupled to control circuitry 306 that may be located away from the slider 300, e.g., on a main circuit board of a storage device.

The control circuitry 306 includes one or more controllers 308 having logic circuits that control various aspects of apparatus operation. The controller 308 may be a general-purpose microprocessor, application-specific integrated circuit (ASIC), etc. The controller 308 is coupled to a clearance control circuit 310 that controls the actuator 304. The clearance control circuit 310 may include amplifiers, digital-to-analog converters (DAC), filters, etc. that facilitate applying a signal to the actuator 304 in response to a command from the controller 308.

A modulation circuit 312 is used to apply a modulated signal 313 to the capacitive sensor 302. The modulation circuit 312 may include amplifiers, DACs, filters, oscillator, etc. that facilitate applying the modulated signal 313 at a predetermined frequency in response to a command from the controller 308. The modulated signal 313 may be any waveform shape (e.g., sine, sawtooth, square) that is modulated at the predetermined frequency.

An analysis circuit 314 reads back a response signal 315 from the capacitive sensor 302. The analysis circuit 314 may include amplifiers, analog-to-digital converters (ADCs), filters, lock-in amplifiers, etc., that facilitate extracting a component of the response signal at the predetermined frequency and supply the results as input to the controller 308. For example the analysis circuit 314 may use a trans-impedance amplifier (current to voltage converter) to measure current modulation resulting from a modulated voltage being applied to the capacitive sensor 302.

The response signal 315 is used to determine a capacitance 318 between a magnetic head of the slider 300 and a magnetic medium 316. The capacitance 318 is indicative of a clearance h between the magnetic head of the slider 300 and the magnetic medium 316. The analysis circuit 314 extracts a component of the response signal 315 at the same predetermined frequency as the modulated signal 313 applied to the sensor 302. While this frequency may be constant, it may alternatively vary so long as the modulation circuit 312 and analysis circuit 314 are capable of determining the frequency at a particular point of time. Using a changable frequency may allow adjusting frequencies based on current use conditions, utilizing frequency hopping, etc.

The measured amplitude and phase of the response signal 315 may be used to infer clearance and/or a contact response. Note that the change in response before contact may be used to infer clearance changes in the spacing. The analysis circuit 314 may extract from the response signal 315 any combination of current amplitude, voltage amplitude, and phase angle or phase shift (the latter measured relative to the applied modulated signal 313). For example, if the modulated signal 313 is voltage-controlled (e.g., modulation circuit 312 configured as a constant voltage source) the analysis circuit 314 may determine one or both of phase shift and current amplitude.

An example is provided to illustrate how the analysis circuit 314 may be used to determine capacitance 318. The capacitive sensor 302 is modeled as a parallel plate capacitor, with the medium 316 acting as one of the plates and air in the gap between the medium 316 and slider 300 acting as a dielectric. The measured fluctuation will vary in inverse proportion to the spacing, h, as shown in Equation [1] below.

$$Q = \frac{\varepsilon A V}{h} \quad [1]$$

In Equation 1, Q represents charge on the capacitor 318, $\varepsilon$ represents the permittivity, A is the area of the interface, V is the applied voltage across the interface, and h is the gap spacing under consideration. Because the voltage V is modulated, it will cause an oscillating current I to be detected. The magnitude of the current I can be expressed as shown in Equation [2].

$$I = \frac{dQ}{dt} = \frac{\varepsilon A}{h}\frac{dV}{dt} \quad [2]$$

As Equation [2] demonstrates, the measured current I will be proportional to 1/h. The amplitude of dV/dt can either be known beforehand or measured. For example, if the applied voltage is a sine wave, then the voltage V is expressed as shown in Equation [3] below, where $\omega$ represents the predetermined frequency of the sine wave. The resulting current I is shown in Equation [4].

$$V = V_{DC} + V_0 \sin(\omega t) \quad [3]$$

$$I = \frac{\varepsilon A}{h} V_0 \omega \cos(\omega t) \quad [4]$$

As seen in Equation [4], the amplitude ($\varepsilon A V_0 \omega/h$) of the measured current oscillation is inversely proportional to the spacing h, with all other components being relatively constant, or predetermined in the case of $\omega$ and $V_0$. Further, because the measured current is at a predetermined frequency, the amplitude can be measured accurately using a very narrow band-pass filter, such as a hardware lock-in amplifier. A similar result may be obtained using digital signal processing (DSP) techniques, such as a software lock-in amplifier. These filters reject random noise, and can therefore provide an effective means for measuring impedance of the capacitive sensor 302 as a function of spacing h.

Figure 4:
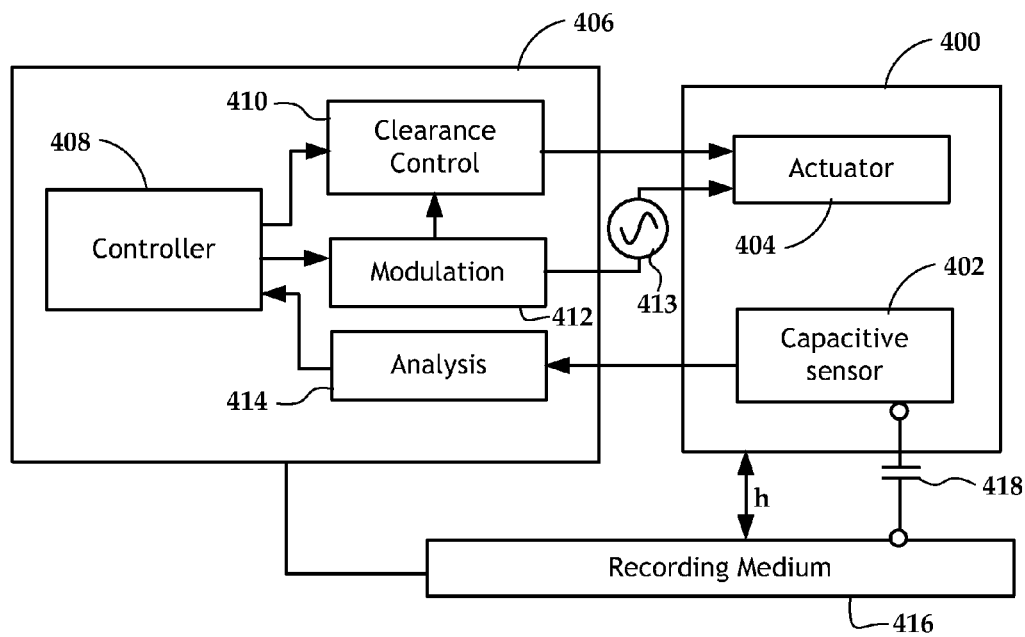

In FIG. 4, a block diagram illustrates a capacitive contact sensing apparatus according to a second example arrangement. A slider 400 includes a capacitive sensor 402 as described above and a clearance actuator 404 (e.g., heater). The slider 400 may include other components not shown, such as magnetic read head, magnetic write head, optical HAMR components, thermal sensors, etc. The slider 400 is coupled to control circuitry 406 that may be located away from the slider 400, e.g., on a main circuit board of a storage device.

The control circuitry 406 includes one or more controllers 408 having logic circuits that control various aspects of apparatus operation. The controller 408 may be a general-purpose microprocessor, ASIC, etc. The controller 408 is coupled to a clearance control circuit 410 that controls the actuator 404. The clearance control circuit 410 may include amplifiers, DACs, filters, etc. that facilitate applying a signal to the actuator 404 in response to a command from the controller 408.

A modulation circuit 412 is used to apply a modulated signal 413 to the actuator 404, either directly or via the clearance control circuit 410. The modulation circuit 412 may include amplifiers, DACs, filters, oscillator, etc. that facilitate applying the modulated signal 413 at a predetermined frequency in response to a command from the controller 408. The modulated signal 413 may be any waveform shape (e.g., sine, sawtooth, square) that is modulated at the predetermined frequency.

The signal 413 applied to the actuator will result in a variation of gap distance h at the same predetermined frequency of the signal 413. This variation in gap distance is detected by the capacitive sensor 402. An analysis circuit 414 reads back a response signal 415 from the capacitive sensor 402. The analysis circuit 414 may include amplifiers, ADCs, filters, lock-in amplifiers, etc., that facilitate extracting a component of the response signal at the predetermined frequency and supply the results as input to the controller 408. For example the analysis circuit 414 may use a trans-impedance amplifier (current to voltage converter) to measure current modulation at the capacitive sensor 402 resulting from the modulated signal 413 being applied to the actuator 404.

The response signal 415 is used to determine a capacitance 418 between a magnetic head of the slider 400 and a magnetic medium 416. The capacitance 418 is indicative of a clearance between the magnetic head of the slider 400 and the magnetic medium 416. The analysis circuit 414 extracts a component of the response signal 415 at the same predetermined frequency as the modulated signal 413 that is applied to the actuator 404. While this frequency may be constant, and/or it may also vary so long as the modulation circuit 412 and analysis circuit 414 are capable of determining the frequency at a particular point of time.

The measured amplitude and phase of the response signal 415 as a function of actuator power are used to infer clearance or a contact response. A change in response before contact may be used to infer clearance changes in the spacing. The analysis circuit 414 may extract from the response signal 415 include any combination of current amplitude, voltage amplitude, and phase shift (the latter measured relative to the applied modulated signal 413). For example, if the capacitive sensor 402 is biased with a fixed DC voltage, the analysis circuit 414 may determine one or both of phase shift and current amplitude of the response signal 415.

An example is provided to illustrate how the analysis circuit 414 may be used to determine capacitance 418. The capacitive sensor 402 is modeled as a parallel plate capacitor as in Equation [1], which was previously discussed above in the previous example. In this example, the modulated signal 413 causes a change in clearance h and not in V, in which case V can remain constant, e.g., DC bias. As a result, the magnitude of the current I can be expressed as shown in Equation [5].

$$I = \frac{dQ}{dt} = \frac{-\varepsilon AV}{h^2}\frac{dh}{dt} \quad [5]$$

If a sine wave is applied to the actuator 404 (although other waveforms may be used), clearance h can be expressed as shown in Equation [6] below, where ω represents the predetermined frequency of the sine wave. With the assumption of a small oscillation applied to the actuator ($h_0 \ll h_{DC}$), the resulting current I is shown below in Equation [7].

$$h = h_{DC} + h_0 \sin(\omega t) \quad [6]$$

$$I = \frac{-\varepsilon A V h_0 \omega}{h_{DC}^2}\cos(\omega t) \quad [7]$$

As shown in Equation [7], the amplitude ($-\varepsilon A V \omega / h_{DC}^2$) of the measured current oscillation is inversely proportional to the spacing $h_{DC}^2$, with all other components being relatively constant or predetermined. The measured amplitude (and optionally phase) of the signal as a function of actuator power may be used to infer clearance or a contact response. Because the measured current is at a predetermined frequency, the amplitude can be measured accurately using a very narrow band-pass filter, such as a hardware lock-in amplifier or DSP. These filters reject random noise, and can therefore provide an effective means for measuring impedance of the capacitive sensor 402 as a function of spacing h.

In both the above examples, the use of a lock-in amplifier or the like greatly increases the SNR of the contact signal because it rejects noise at frequencies other than the drive frequency. These techniques provide a high resolution measurement of the impedance of the interface to infer the spacing and contact between the head and the disk. Also in these examples, the predetermined frequency w can be selected by the system designer for modulating the actuator bias and/or capacitive sensor bias. This provides flexibility in that predetermined frequency can be selected to be non-interfering with natural resonant frequencies associated with the magnetic head. For example, the arm, gimbal, head disk interface, etc., will have resonant frequencies that may result in noise generated at those frequencies and/or cause sensors and associated signal lines to operate at those frequencies. Similarly, other signal processing frequencies may be used with the magnetic head, such as read and write channels signals. The predetermined frequency can be selected to be non-interfering with those other frequencies as well.

Figure 5:
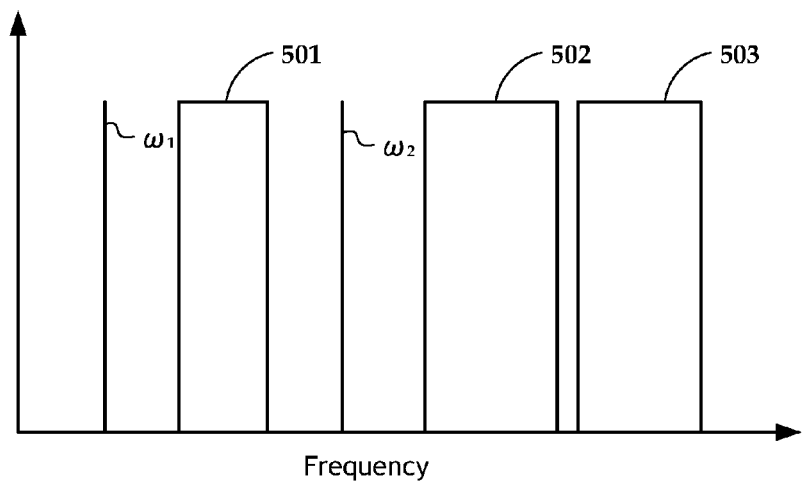
FIG. 5 is a graph illustrating the selection of non-interfering, predetermined frequencies for a capacitive clearance sensing arrangement according to an example embodiment.

An example of how predetermined frequencies may be selected according to an example embodiment is shown in the graph of FIG. 5. Regions 501-503 represent frequency ranges in which significant noise and/or interference may be encountered during device operation. As such, a system designer may select one or both of $\omega_1$ and $\omega_2$ (and frequencies or ranges nearby) as a modulation frequency. The interfering ranges 501-503 can vary from system to system, and so the system designer may adapt the capacitive sensing devices and methods described herein for different systems by selecting a different operating frequency. This can be less complicated than, for example, defining a different acoustic emission (AE) profile for different design iterations, and determining clearance/contact based on those AE profiles.

Figure 6:
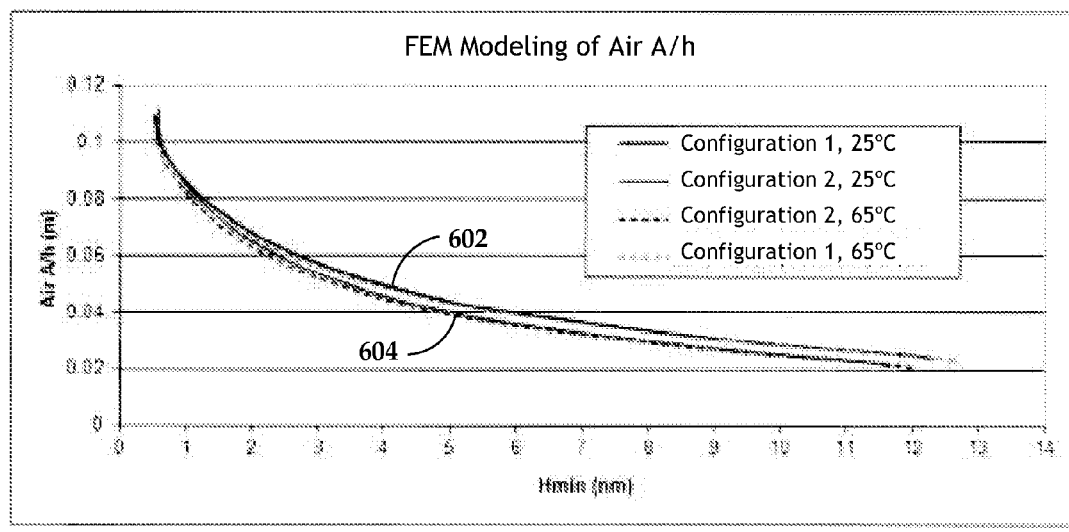
FIG. 6 is a graph showing finite element analysis results for capacitive clearance sensing arrangements according to example embodiments.

In reference now to FIG. 6, a graph shows results of a finite element model (FEM) according to an example embodiment. Reference numbers 602 and 604 indicated pairs of curves, each pair associated with FEM results of a different design. The dashed line within each pair 602, 604 show results at 65C, and the solid lines within each pair show results at 25C. These curves 602, 604 show the expected increase in capacitance with decreasing clearance.

Figure 7:
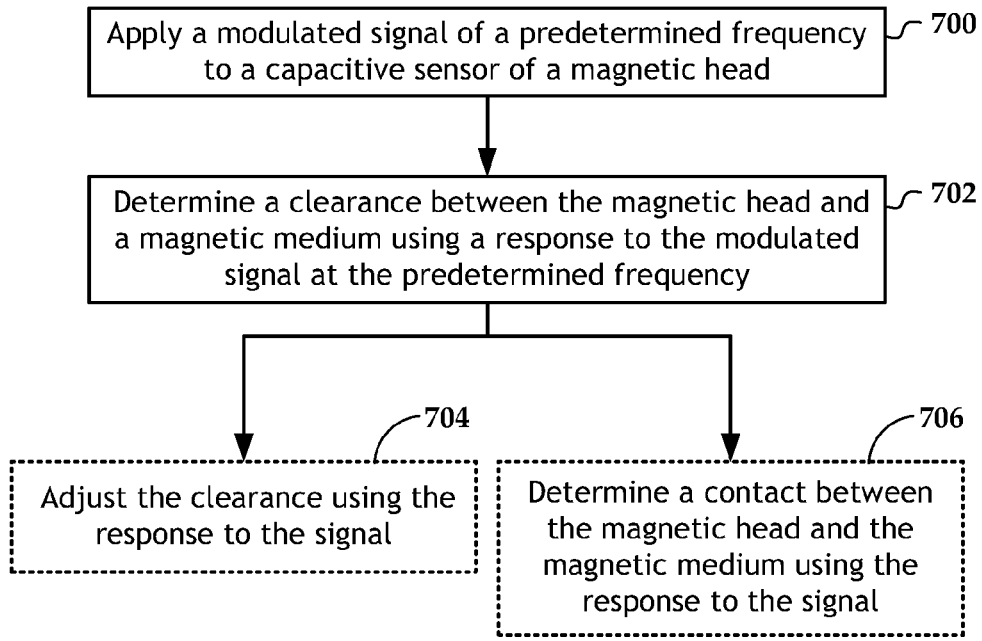
FIGS. 7 and 8 are flowcharts illustrating methods according to example embodiments.

In reference now to FIG. 7, a flowchart shows a method according to an example embodiment. The method involves applying 700 a modulated signal of a predetermined frequency to a capacitive sensor of a magnetic head. The predetermined frequency may be selected to be non-interfering with natural resonant frequencies associated with the magnetic head and/or non-interfering with other signal processing frequencies used with the magnetic head. The capacitive sensor is located proximate to a media-facing surface of the magnetic head. The capacitive sensor may include at least a portion of a magnetic write transducer of the magnetic head and/or a shield of a magnetic read transducer.

A clearance is determined 702 between the magnetic head and a magnetic medium using a response to the modulated signal at the predetermined frequency. The method optionally involves adjusting 704 the clearance using the response to the signal (e.g., via an actuator proximate the magnetic head) and/or determining 706 a contact between the magnetic head and the magnetic medium using the response to the signal.

Figure 8:
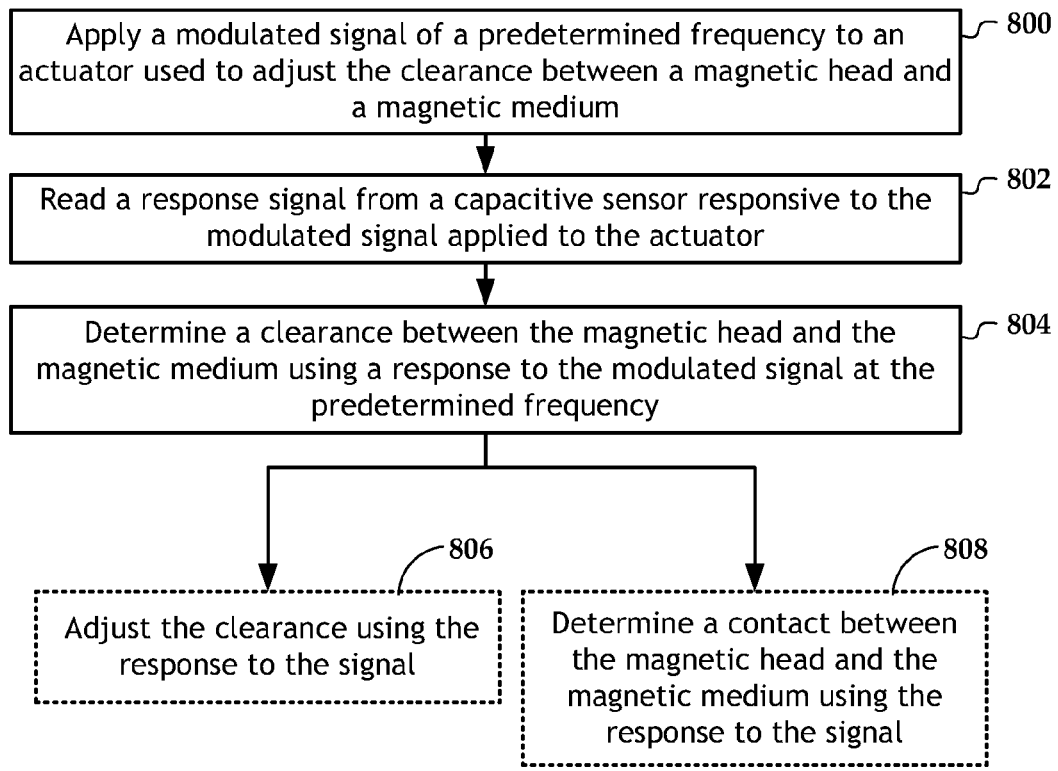

In reference now to FIG. 8, a flowchart shows a method according to another example embodiment. The method involves applying 800 a modulated signal of a predetermined frequency to an actuator used to adjust the clearance between a magnetic head and a magnetic medium. The predetermined frequency may be selected to be non-interfering with natural resonant frequencies associated with the magnetic head and/or non-interfering with other signal processing frequencies used with the magnetic head.

A response signal is read 802 from a capacitive sensor responsive to the modulated signal applied to the actuator. The capacitive sensor is located proximate to a media-facing surface of the magnetic head. The capacitive sensor may include at least a portion of a magnetic write transducer of the magnetic head and/or a shield of a magnetic read transducer. A clearance is determined 804 between the magnetic head and a magnetic medium using a response to the modulated signal at the predetermined frequency. The method optionally involves adjusting 806 the clearance using the response to the signal and/or determining 808 a contact between the magnetic head and the magnetic medium using the response to the signal.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    applying a modulated signal of a predetermined frequency to a capacitive sensor of a magnetic head, the capacitive sensor being located proximate to a media-facing surface of the magnetic head and the predetermined frequency being selected to be non-interfering with natural resonant frequencies associated with the magnetic head; and
    determining a clearance between the magnetic head and a magnetic medium using a response to the modulated signal at the predetermined frequency.

2. The method of claim 1, wherein the predetermined frequency is selected to be non-interfering with other signal processing frequencies used with the magnetic head.

3. The method of claim 1, wherein the capacitive sensor comprises at least a portion of a magnetic write transducer of the magnetic head.

4. The method of claim 1, wherein the capacitive sensor comprises a shield of a magnetic read transducer.

5. The method of claim 1, further comprising adjusting the clearance using the response to the modulated signal.

6. The method of claim 1, further comprising determining a contact between the magnetic head and the magnetic medium using the response to the modulated signal.

7. The method of claim 1, wherein the clearance between the magnetic head and the magnetic medium is determined using a measured amplitude of the modulated signal at the predetermined frequency.

8. An apparatus comprising:
    a slider comprising a capacitive sensor and magnetic head proximate a media-facing surface of the magnetic head;
    a modulation circuit coupled to the capacitive sensor and configured to apply a modulated signal of a predetermined frequency to the capacitive sensor, the predetermined frequency being selected to be non-interfering with natural resonant frequencies associated with the slider; and
    an analysis circuit coupled to the capacitive sensor and configured to determine a clearance between the magnetic head and a magnetic medium using a response to the modulated signal at the predetermined frequency.

9. The apparatus of claim 8, wherein the predetermined frequency is selected to be non-interfering with other signal processing frequencies used with the slider.

10. The apparatus of claim 8, wherein the magnetic head comprises a magnetic write transducer, and wherein the capacitive sensor comprises at least part of the magnetic write transducer.

11. The apparatus of claim 8, wherein the magnetic head comprises a magnetic read transducer, and wherein the capacitive sensor comprises a shield of the magnetic read transducer.

12. The apparatus of claim 8, wherein the slider comprises an actuator used to adjust the clearance between the magnetic head and the magnetic medium at the media-facing surface, the apparatus further comprising a control circuit coupled to the magnetic head and the analysis circuit and configured to adjust the clearance via the actuator using the response to the modulated signal.

13. The apparatus of claim 8, wherein the analysis circuit comprising a lock-in amplifier used to measure at least an amplitude at the predetermined frequency.

14. An apparatus comprising:
    a magnetic head comprising a capacitive sensor proximate a media-facing surface of the magnetic head, and an actuator used to adjust a clearance between the magnetic head and a magnetic medium at the media-facing surface;
    a modulation circuit coupled to the magnetic head and configured to apply a modulated signal of a predetermined frequency to the actuator, the predetermined frequency being selected to be non-interfering with natural resonant frequencies associated with the magnetic head;
    an analysis circuit coupled to the magnetic head and configured to read a response signal generated at the capacitive sensor in response to the modulated signal applied to the actuator, determine the clearance between the magnetic head and the magnetic medium using a component of the response signal at the predetermined frequency.

15. The apparatus of claim 14, wherein the predetermined frequency is selected to be non-interfering with other signal processing frequencies used with the magnetic head.

16. The apparatus of claim 14, wherein the magnetic head comprises a magnetic write transducer, and wherein the capacitive sensor comprises at least part of the magnetic write transducer.

17. The apparatus of claim 14, wherein the magnetic head comprises a magnetic read transducer, and wherein the capacitive sensor comprises a shield of the magnetic read transducer.

18. The apparatus of claim 14, further comprising a control circuit coupled to the magnetic head and the analysis circuit and configured to adjust the clearance via the actuator using the response to the modulated signal.

19. The apparatus of claim 14, wherein the analysis circuit comprising a lock-in amplifier used to measure at least an amplitude at the predetermined frequency.

* * * * *